Sept. 9, 1947.  A. F. EMRICH  2,426,991
DRAFTING-MACHINE ALIGNING TOOL
Filed July 4, 1945
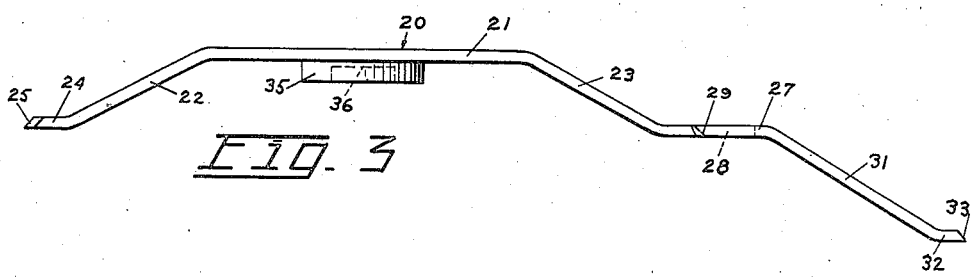
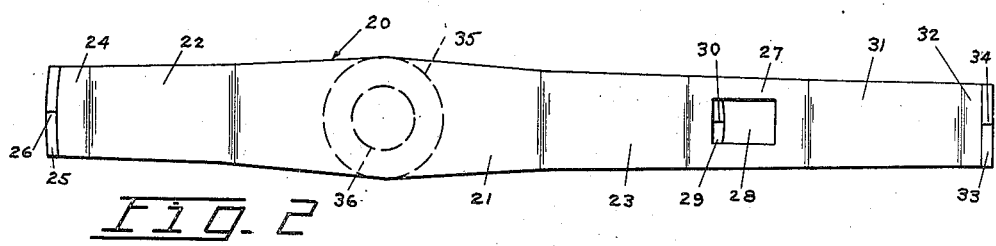
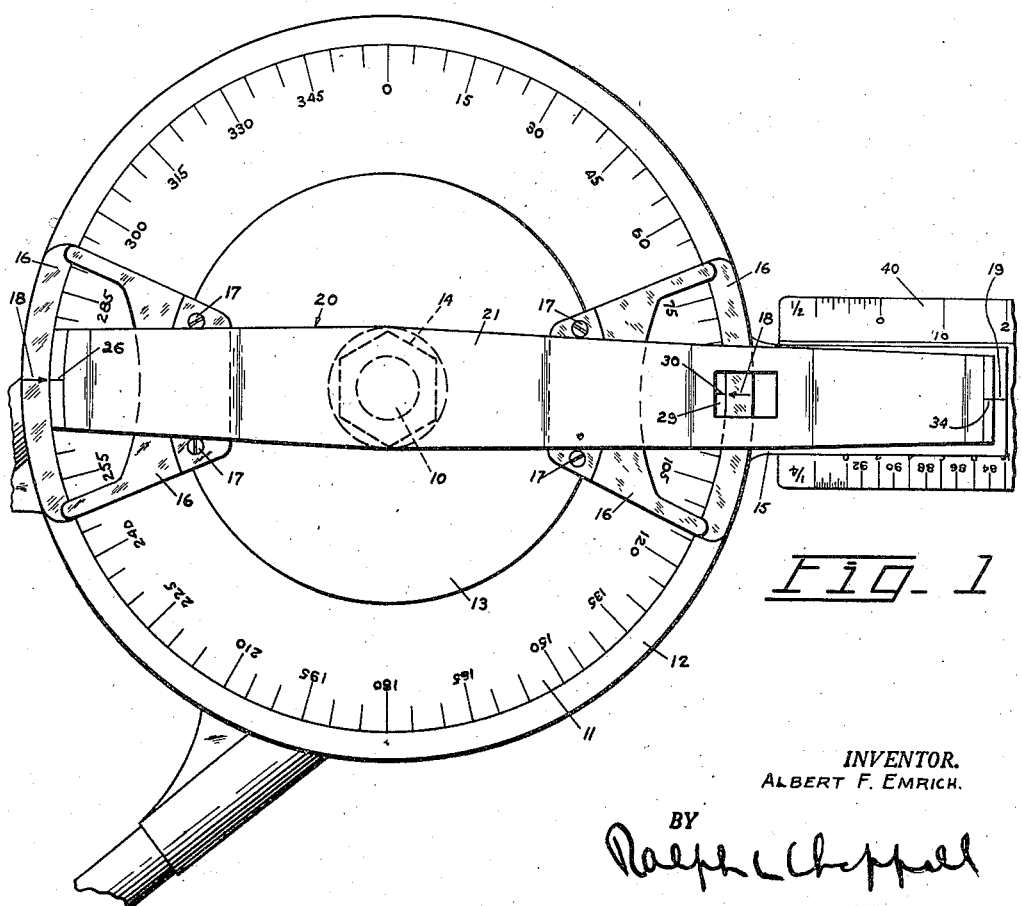
INVENTOR.
ALBERT F. EMRICH.
BY
ATTORNEY.

Patented Sept. 9, 1947

2,426,991

UNITED STATES PATENT OFFICE 2,426,991

DRAFTING-MACHINE ALIGNING TOOL

Albert F. Emrich, Valley Stream, N. Y.

Application July 4, 1945, Serial No. 603,247

2 Claims. (Cl. 33—181)

(Granted under the act of March 3, 1883, as amended April 30, 1928; 370 O. G. 757)

This invention relates to a tool for aligning parts of a universal drafting machine.

An object of this invention is to provide a simple tool that can be used to align the deadlines of a universal drafting machine with respect to each other and with respect to the scale arm of the machine.

Another object is to provide a tool which is of simple construction and of small size which can be used by unskilled personnel to align the deadlines and scale arm of a universal drafting machine.

Further objects and advantages of this invention, as well as its construction, arrangement and operation, will be apparent from the following description and claims in connection with the accompanying drawing, in which Fig. 1 is a top plan view of a conventional type of universal drafting machine, omitting portions unessential to the disclosure of this invention, and showing the aligning tool in use, Fig. 2 is a top plan view of the aligning tool, and Fig. 3 is a front view in elevation of the aligning tool.

Fig. 1 shows portions of a universal drafting machine essential to the understanding of this invention and the aligning tool in use. On the screw or mast 10 of the drafting machine are rotatably mounted the compass rose 11, outer ring 12, and disc 13, disc 13 being secured to mast 10 by means of nut 14. Scale arm 15 which mounts a straight edge or scale 40 is made integral with or permanently fixed to the mast 10.

The deadlines 16 are secured to disc 13 by means of screws 17 and have indicators 18 for use in conjunction with the graduations of the compass rose 11.

Since scale arm 15 is integral with mast 10 and since disc 13 is securely attached to mast 10 by nut 14, movement of the scale arm 15 and scale 40 causes deadlines 16 to move over compass rose 11 and permit setting of indicators 18 as desired. It is, of course, desirable at all times to have the indicators 18 and the centerline 19 of the scale arm 15 in alignment. This is clearly illustrated when the universal drafting machine is used in navigation.

When used for this purpose the navigator orients the compass rose 11 (clamping it in position by means not illustrated) so that zero is toward the top of his work table, zero indicating north, 90 degrees indicating east, 180 degrees indicating south, and 270 degrees indicating west.

With the indicators 18 at 90 degrees and 270 degrees and the scale 16 in line, the latitude lines of the chart are brought into alignment with the edge of scale 40, and the chart tacked in place. The graduations of the compass rose 11 now are in agreement with directions on the chart and the machine is ready for drawing course lines, bearing lines, and other necessary lines.

With usage and loosening of nut 14, it has been found that indicators 18 get out of line with each other and quite frequently with respect to the center line 19 of scale arm 15. To remedy this condition quickly the nut 14 is loosened, freeing disc 13, the aligning tool 20 used to align indicators 18 and center line 19, and the nut 14 tightened again with the parts in proper alignment. The screws 17 may be loosened, too, in the event the indicators 18 are out of alignment with respect to each other, and subsequently tightened again after proper realignment.

The aligning tool 20 is essentially a narrow strip of rigid material, preferably metal, and has a flat portion 21 from which descend two inclined portions 22 and 23. Extending from the inclined portion 22, is a short flat portion 24 which has a beveled edge 25 and indicator 26. Extending from the inclined portion 23 is a flat portion 27 which has a cut out 28, one side of which is beveled at 29, and has the indicator 30.

Extending from the flat portion 27 is another inclined portion 31 which is continued by short flat portion 32 which has a beveled edge 33 and indicator 34. The indicators 26, 30 and 34 are in alignment, necessarily, for the proper functioning of the tool. It is to be noted, too, that the configuration illustrated and described permits the tool to clear protruding parts of the drafting machine and permits the indicators to be placed contiguously to the parts to be aligned.

Centrally located below the flat portion 21 is a circular boss 35 having a circular recess 36.

In operation the recess 36 of boss 35 is placed on the mast 10 rotatably to support the tool, the indicators 26 and 30 are used to align the indicators 18 and the indicator 34 is used to align the centerline 19. With the indicators 18 and the centerline 19 in alignment, the movable parts are screwed into fixed position and the device is ready for use.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An aligning tool comprising an elongated member, said elongated member having a flat portion, an inclined portion connected to said flat portion, a flattened end portion on said inclined portion, an indicator on said end portion, a second inclined portion connected to said flat portion, a second flat portion connected to said second inclined portion, a cut out in said second flat portion, an indicator on the periphery of said cut out, a third inclined portion connected to said second flat portion, a flattened end portion on said third inclined portion, and an indicator on said last named end portion.

2. An aligning tool comprising an elongated member, a flat portion on said elongated member, a downwardly inclined member contiguous to said flat portion, a flat end portion on said downwardly inclined member, a beveled edge on the extremity of said flat end portion, an indicator on said beveled edge, a second downwardly inclined member contiguous to said flat portion, a second flat portion contiguous to said second inclined member, a cut out in said second flat portion, a beveled edge on the periphery of said cut out, an indicator on said beveled edge, a third downwardly inclined member contiguous to said second flat portion, a flat end portion on said third downwardly inclined member, a beveled edge on said last named end portion, an indicator on said beveled edge, all said indicators being in the same plane, a boss below said first named flat portion, and a recess in said boss.

ALBERT F. EMRICH.

REFERENCES CITED

The following references are of record in the file of this patent:

UNITED STATES PATENTS

| Number | Name | Date |
|---|---|---|
| 340,883 | Kells | Apr. 27, 1886 |
| 944,462 | Osborne | Dec. 28, 1909 |
| 1,514,452 | Frederickson et al. | Nov. 4, 1924 |

FOREIGN PATENTS

| Number | Country | Date |
|---|---|---|
| 846,691 | France | June 12, 1939 |
| 1,524 | Great Britain | 1905 |